Feb. 18, 1969 — W. C. DEE — 3,427,879
FLOW METER
Filed June 13, 1966 — Sheet 1 of 2
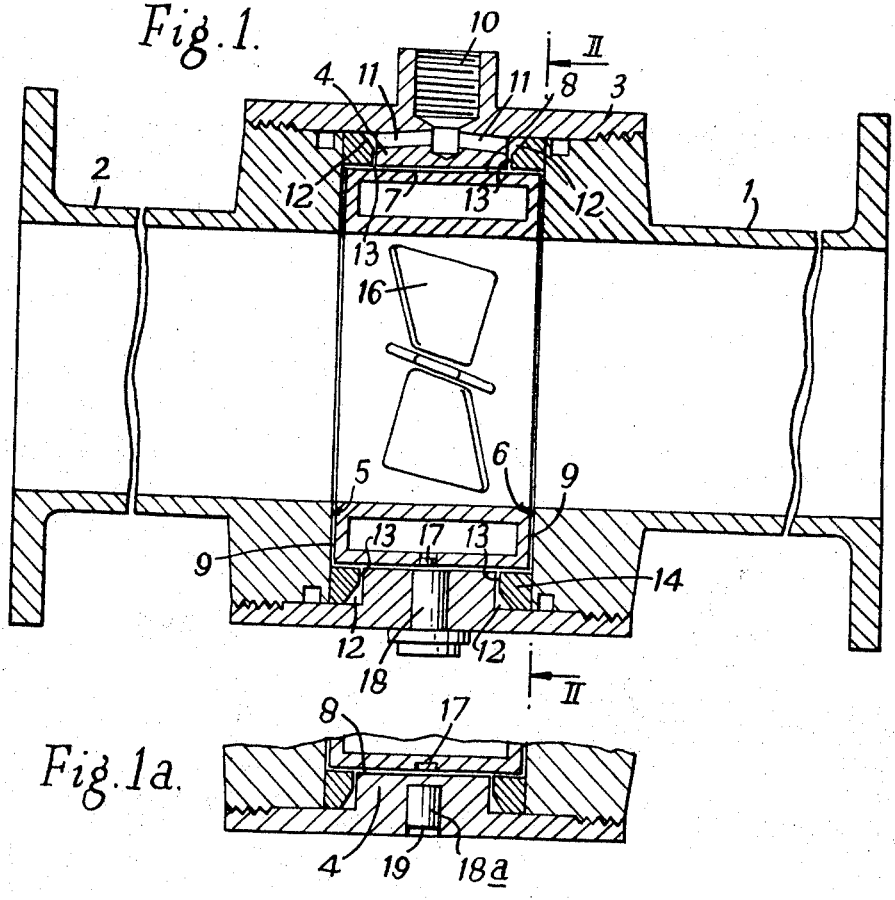
Fig.1.
Fig.1a.
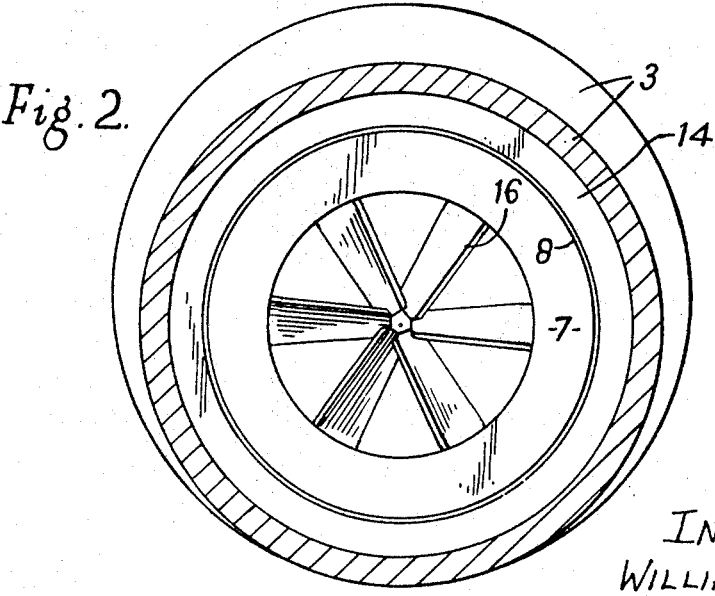
Fig.2.
INVENTOR:
WILLIAM C. DEE

United States Patent Office 3,427,879
Patented Feb. 18, 1969

3,427,879
FLOW METER
William C. Dee, Bournemouth, England, assignor to Gilbert C. Davis, Forest Town, Johannesburg, Transvaal, Republic of South Africa
Filed June 13, 1966, Ser. No. 557,230
Claims priority, application Great Britain, June 25, 1965, 26,987/65
U.S. Cl. 73—231                                4 Claims
Int. Cl. G01f *1/06*

ABSTRACT OF THE DISCLOSURE

A rotor of a flow meter is driven by the fluid at a rate of rotation dependent on the flow velocity. The rotor is supported wholly externally of the fluid flow path by a gas bearing means located at the outer periphery of the rotor. Such a location of the bearing means eliminates a central obstruction in the bore of the meter.

---

A known form of flow meter for sensing or measuring flow of a fluid along a flow path comprises a stator defining a flow path for the fluid, and a driven element, such as a turbine or paddle wheel, disposed within the flow of fluid, and carried by bearing means on a fixed support structure positioned within the flow of fluid. Such an arrangement has the disadvantage that the support structure, being itself situated in the flow of fluid, constitutes an impediment to or restriction of the flow of fluid, and may give rise to an appreciable undesirable pressure drop in the flow of fluid.

It is the object of the present invention to provide an improved construction of flow meter wherein there is no obstruction of the flow of fluid by any fixed structure or bearing means for such a driven element, and wherein because there is no central obstruction within the bore the speed of rotation of the driven element, e.g. an impeller, is directly related to the true fluid velocity in the flow path, no correction being necessary for the acceleration of flow inherent in the conventional turbine type of flow meter.

According to the present invention, in a flow meter for fluids, e.g. liquids, gases or slurries of the kind comprising a stator defining a flow path for the fluid and a fluid-driven element rotatable in said flow path about an axis substantially parallel to the flow of fluid, the driven element is carried by bearing means which are disposed wholly externally of the path of fluid past the driven element. The bearing means thus do not present any impediment to the flow, or adversely affect downstream flow characteristics, nor vary the cross-section or cross-sectional area of the flow path. Only the driven element is positioned within the fluid flow, and the resistance exerted against the fluid flow is only that necessary to rotate the driven element.

The pressure loss associated with the flow meter is therefore a minimum as compared with the pressure loss in the conventional turbine flow meter associated with the inefficient pressure recovery in the diffusing section after the rotor. Because of the negligible frictional torque and lack of obstruction in the flow path, the driven element can be designed to run synchronously with the fluid flow and present negligible obstruction or restriction, in effect as though the flowmeter were an open bore tube.

The construction of the present invention further permits or facilitates the construction of, and accuracy of flow measurement in flowmeters of relatively very small sizes.

In a preferred form, the driven element is mounted in a sleeve the bore of which forms a stepless continuation of inlet and outlet bores of the stator.

The driven element may be removably mounted within such a sleeve, and any desired one of a set of such driven elements may be inserted in accordance with the nature of the flow to be measured or sensed.

The driven element itself may be adjustable into and between relatively finer and coarser settings, for adjustment according to the nature of the flow.

The driven element may be in two or more axially spaced portions, and it or its portions may comprise a plurality of radial blades presenting a face inclined or twisted with respect to the flow of fluid, such blades being preferably adjustable in pitch or setting, and/or in number, according to the flow to be measured, or sensed.

Transmission of information from the driven element to the exterior may take place in any convenient manner, e.g. visually, electrically, or electronically, or mechanically.

In a preferred form, for reduction of drag to a minimum, the driven element is carried by gas bearing means, e.g. one or more gas journal bearings, with or without gas axial thrust bearings. Although leakage of the bearing pressure gas medium into the fluid flow may occur in axial thrust gas bearings, the volume of such leakage may be made substantially negligible, and a pressure gas medium compatible to the fluid flow may be selected.

The bleed of the gas into the outer diameter of the bore of the rotating element substantially reduces frictional losses through the measuring section, especially in the case of high density fluids.

In order that the nature of the invention may be readily ascertained, three embodiments of gas-bearing full-bore flowmeters in accordance therewith are hereinafter particularly described with reference to the figures of the accompanying drawings, wherein:

FIG. 1 is an axial section of a first embodiment of flow meter;

FIG. 1*a* is a partial axial section to show a modification thereof;

FIG. 2 is a radial section taken on the line II—II of FIG. 1;

Figure 3:
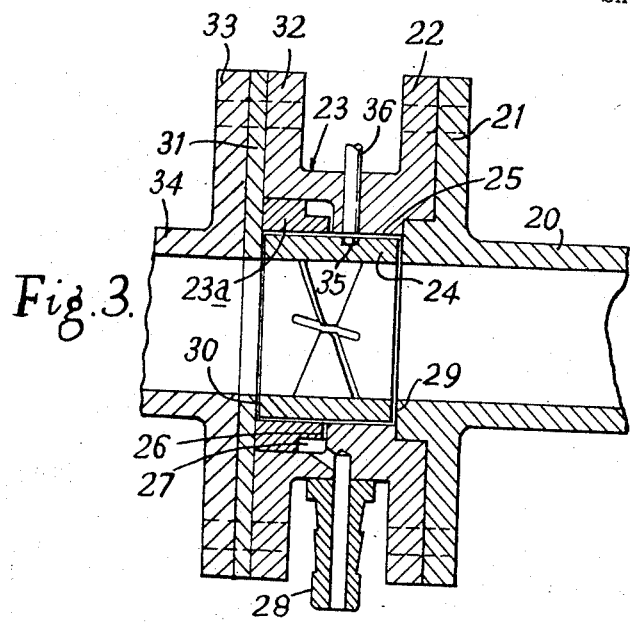
FIG. 3 is an axial section of a second embodiment of flow-meter.

Referring to FIGS. 1 and 2, the flow-meter comprises a stator body constituted by a flanged inlet conduit 1 and a flange outlet conduit 2 both threaded into a common central housing 3.

Between a portion 4 of the housing and the end face 5 and 6 respectively of the two conduits there is defined an annular space to receive an annular rotor sleeve 7. Between the circumference of the rotor sleeve and the housing portion 4 there is defined a journal gas bearing gap 8. Between the end faces of the rotor sleeve 7 and the respective end faces 5 and 6 of the conduits there are defined axial thrust gas bearing gaps 9.

Gas under pressure for feeding the bearing gaps is supplied through a port 10 communicating with longitudinal bores 11 which feed annular channels 12. From the channels 12, the gas passes radially inwards through the path indicated by reference 13. This path may be a plurality of radial passages defined between the portion 4 and the adjacent rings 14 and produced for example by milling channels radially at symmetrically angular spacings in the end face of the rings 14, and then butting the channeled faces up against a plane lapped end face of the portion 4. This method of forming feed passages is described more fully in British patent specification No. 1,099,560.

The axial thrust bearing gaps 9 are supplied by gas exhausting from the journal bearing gap, and the gas is subsequently vented into the bore of the flowmeter.

Within the rotor sleeve there is secured a set of inclined blades 16 to cause the rotor to be driven in rotation by the axial flow of fluid through the meter. The bore of the rotor is of the same diameter as, and forms a stepless continuation of, the bore of the conduits 1 and 2.

Such blades may be adjustable in pitch, or may be removable and replaceable by one or more other sets of different blades, according to the flow to be measured. The sleeve may also contain a plurality of axially spaced sets of such blades.

In the outer cylindrical wall of the rotor 7 there is secured, at equal intervals about the axis, a plurality of magnetic inserts 17 which coact with a magnetic detector element 18 mounted in the portion 4 of the housing. Rotation of the rotor causes the production of impulses in the detector, and their frequency can be measured in any convenient manner to provide a direct reading of rate of flow, or comparative rate of flow.

In the modification shown in FIG. 1a, it is assumed the portion 4 is made of non-magnetic material and the magnetic detector 18a is housed within a blind hole 19 which does not extend as far as the journal bearing gap 8, so that no risk of gas leakage arises.

Referring now to FIG. 3, there is shown an embodiment of flow-meter which is intended for insertion, with a relatively small axial length, in existing pipe lines. On the right-hand side of the figure in this drawing, a pipe line 20 has a radial flange to which a flange 22 of the housing 23 can be bolted. A bore in the housing defines, with the circumference of a rotor sleeve 24, a journal gas bearing gap 25 fed through a plurality of annular radial slots 26 from an annular distribution channel 27 supplied by an inlet port 28. A thrust bearing gap 29 is defined between an end face of the rotor and an end face of the pipe line 20.

At the left-hand side of the figure in this drawing, there is shown an alternative arrangement wherein an axial thrust bearing gap 30 is defined between the other end face of the rotor sleeve 24 and a ground and lapped face of a ring 31 positioned between a flange 32 of the housing, and a flange 33 of the pipe line 34.

The left-hand portion of the journal bearing gap is defined between an inserted annulus 23a and the circumference of the rotor 24.

The bores of the pipe line 20, rotor sleeve 24, ring 31, and pipe line 34 are all of the same diameter. One or more magnetic inserts 35 are provided in the rotor sleeve to coact with a magnetic detector 36 in the housing.

Figure 4:
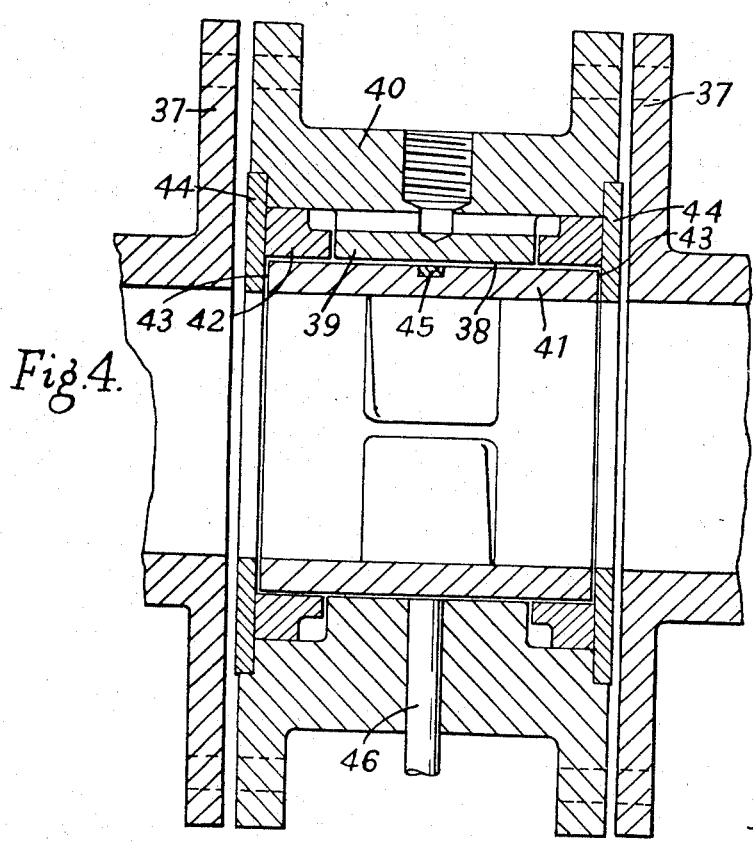
FIG. 4 is an axial section of a third embodiment of flow-meter.

The embodiments of FIG. 4 is again intended for inserting between end flanges 37 of two sections of pipe line.

The journal bearing gap 38 is defined partly between a central portion 39 of the housing 40 and the rotor 41 and partly between inserted rings 42 and the rotor 41.

Axial thrust bearing gaps 43 are defined, between each end face of the rotor and rings 44 seated in recesses in the axial end faces of the housing 40 and clamped therein when the pipe line flanges 37 are bolted in position on the housing 40. Magnetic inserts 45 in the rotor coact with a magnetic detector 46 in the housing. The bores of the pipe line sections, the rings 44, and the rotor 41 are all of the same diameter.

Where the flow meters described above are required to operate under widely differing conditions, the blades of the rotor could be replaceable by other sets, or made adjustable in pitch.

The flow meters illustrated can be readily installed into, and removed from, existing systems without disturbance to the adjacent pipe work.

Due to the absence of conventional ball bearings and lubricants, such flow meters can be made to operate over a comparatively very wide range of temperature.

The frequency of impulses derived from the detector may be arranged to give a direct or comparative rate-of-flow reading, or may act through feed-back means to provide flow control.

The magnetic detector may be a simple coil, or a magnetic reed switch giving a pulsed output.

The rotor sleeve as a whole may serve as a magnetic rotor for a rotating field generator, giving an A.C. voltage output used for measuring the flow rate.

Such a flow meter may also serve as an anemometer, and by suitable calibration in accordance with the density of the fluid may give an indication of mass/flow.

I claim:

1. A rotary flow meter for fluids comprising a stator and a rotor disposed within said stator, said stator and rotor defining a flow path for the fluid, said rotor including a fluid-driven element disposed in said flow path and rotatable about an axis substantially parallel to the flow of fluid, said rotor having an inner periphery defining part of the flow path for the fluid, said rotor having a cylindrical outer periphery defining, with the stator, a cylindrical journal bearing gap which remains unaffected by end thrust exerted on the rotor, said rotor defining with said stator radial end thrust bearing gaps respectively one at each end of said rotor, said journal bearing gap and said end thrust bearing gaps being disposed wholly radially outwardly beyond the path of flow of fluid past the fluid-driven element, means providing gas bearing pressure to said journal bearing gap and said end thrust bearing gaps, and means for determining rate of rotation of the rotor driven by the fluid flow.

2. A rotary flow meter for fluids, as claimed in claim 1, wherein said stator has a cylindrical inlet bore and an axially-spaced coaxial cylindrical outlet bore of the same diameter as said inlet bore, and wherein said rotor is a sleeve having the fluid-driven element therein, said sleeve being disposed axially between said inlet bore and said outlet bore, the inner periphery of said sleeve being cylindrical and of the same diameter as said inlet bore and said outlet bore and forming a step-less continuation thereof.

3. A rotary flow meter for fluids, as claimed in claim 1 wherein said fluid-driven element consists of a plurality of angularly-spaced radial blades each presenting a face inclined with respect to the plane containing the axis of rotation of the rotor.

4. A rotary flow meter for fluids as claimed in claim 2, wherein said sleeve has a radial face at each end, and wherein the stator comprises respective radial faces disposed opposite to and axially spaced from each radial end face of the sleeve and defining therewith respective end thrust bearing gaps.

References Cited

UNITED STATES PATENTS 3,053,086   9/1962   Granberg _____ 73—230

FOREIGN PATENTS 874,464   8/1961   Great Britain.
945,366   12/1963   Great Britain.

RICHARD C. QUEISSER, *Primary Examiner.*

EDWARD D. GILHOOLY, *Assistant Examiner.*